Dec. 1, 1964  H. F. WELSH ETAL  3,159,256
WRAP SPRING CLUTCH
Original Filed April 27, 1956
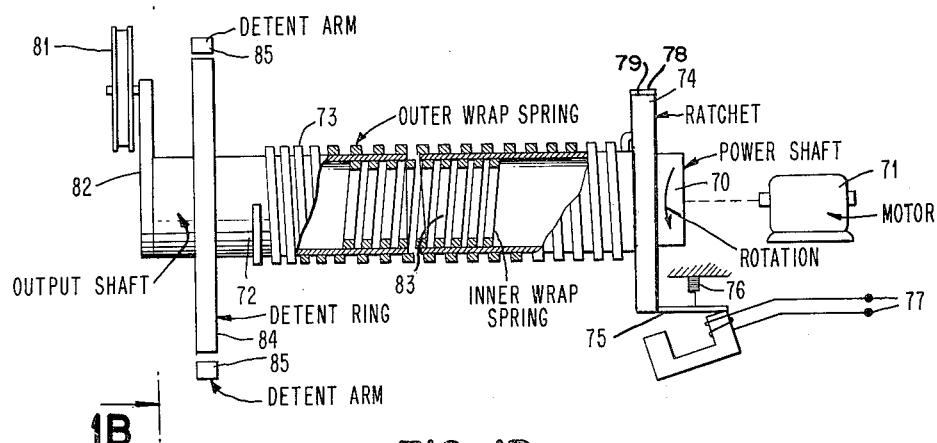
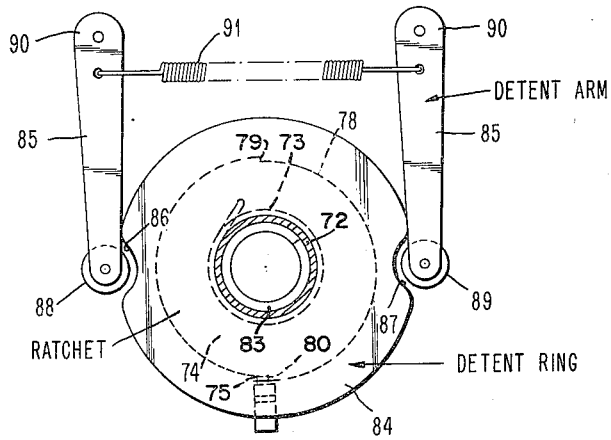
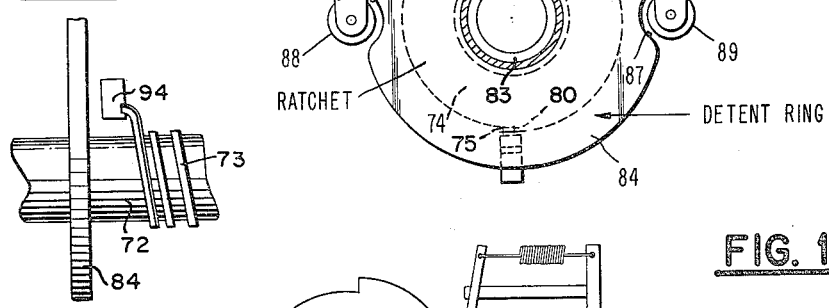
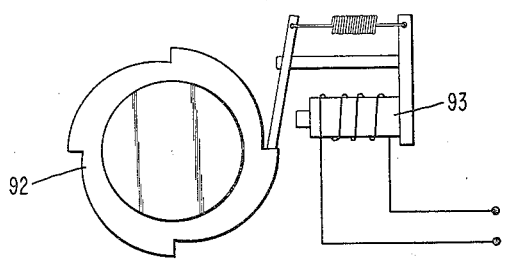
*INVENTOR.*
H. F. WELSH
N. J. APPLETON
M. SILVERBERG
BY William M. Miller Jr.
AGENT

United States Patent Office 3,159,256
Patented Dec. 1, 1964

3,159,256
WRAP SPRING CLUTCH
Herbert Frazer Welsh and Norman J. Appleton, Philadelphia, and Morton Silverberg, Elkins Park, Pa., assignors to Sperry Rand Corporation, New York, N.Y., a corporation of Delaware
Original application Apr. 27, 1956, Ser. No. 581,235, now Patent No. 3,021,512, dated Feb. 12, 1962. Divided and this application June 20, 1961, Ser. No. 124,268
2 Claims. (Cl. 192—81)

This application is a division of co-pending application Serial No. 581,235, filed April 27, 1956 entitled "Selector Mechanisms," now Patent No 3,021,512, issued Feb. 12, 1962.

This invention relates to wrap spring clutches, and, in particular, to such clutches which are actuable by electrical control pulses.

Servo-mechanism controlled positioning mechanisms, and selector mechanisms such as described in our aforesaid patent, employ various types of pulse or signal responsive actuators. A preferred form of the invention utilizes selectively actuated wrap spring clutches of novel design.

An object of the present invention resides in the provision of an improved wrap spring clutch.

Another object of the present invention resides in the provision of an improved wrap spring clutch capable of actuation by electrical control pulses.

The foregoing objects, advantages, construction and operation of the present invention will become more readily apparent from the following description and accompanying drawings, in which:

FIGURE 1A illustrates an improved wrap spring clutch constructed in accordance with the present invention;

FIGURE 1B is a view taken on line B—B of FIGURE 1A;

FIGURE 1C illustrates an alternative ratchet and stop mechanism for a wrap spring clutch such as may be employed in the present invention; and FIGURE 1D illustrates a further portion of another alternative form of wrap spring clutch such as may be employed in the present invention.

In the servo-positioning devices of the prior art, many forms of actuating members have been used. One such actuating member is the solenoid, and this has been very popular in devices of this type. However, it has been found that in servo-positioning systems, a preferred actuator takes the form of 180° revolution clutches, and the elements to be moved, such as rotatable pulleys, are eccentrically mounted on an output shaft of such half-revolution clutches for moving the said pulleys to their said binary positions, thereby to alter the effective length of cable and the effective position of the work piece or transducer.

It is noted that a 180° clutch is one which, upon being pulsed with the proper signal, proceeds to rotate from one fixed position to another position 180° away. Attached fully rotating pulleys, eccentric to the axis of rotation of the clutch, will therefore displace through a distance equal to twice the eccentricity. The output motion, due to each clutch, is basically sinusoidal; and if the clutches are started at the same time and have the same r.p.m., the full output is basically sinusoidal. This means that the output is started at maximum acceleration and zero velocity, is then brought up to maximum velocity and zero acceleration at a point near the center of the stroke; and is then brought to a stop with maximum acceleration and minimum velocity at the end of the stroke. The time of travel from any one position to any other is thus the same regardless of the distance moved.

Another important benefit deriving from the use of a clutch of the aforementioned type, is that the eccentric loading matches the impedance of the input power source and of the output. At the beginning and end of a cycle, when the forces are high (and the velocity is low) the pulley is near top dead-center giving the clutch a large mechanical advantage. At the mid-stroke (when the acceleration is near zero), the mechanical advantage is in favor of the cable. The design of the clutch accordingly becomes an important factor in the total mechanical selector unit and one type of clutch known as the wrap spring clutch is particularly suited for this type of service. A preferred form of such wrap spring clutch is illustrated in FIGURE 1A; and it will be noted from the subsequent description that some of the elements comprising this clutch differ from conventional wrap spring clutches.

Thus, referring to FIGURE 1A, it will be seen that in accordance with the present invention, an actuator taking the form of a wrap spring clutch may comprise a power shaft 70 which is constantly rotated by a motor 71; and an output shaft 72 is disposed collinear with the power shaft 70 and spaced therefrom. An outer wrap spring 73 is placed about the power shaft 70 and output shaft 72, and the turns of the said spring 73 are divided between the said output shaft and the power shaft. A ratchet 74 (the configuration of which is more easily seen in FIGURE 1B) is carried by the power shaft 70 and is adapted to be capable of free rotation on the said shaft 70. Spring 73 is coupled at one of its ends to the said ratchet 74, and is coupled at the other of its ends to output shaft 72.

In the design of the clutch, the diameters of the power shaft 70 and output shaft 72 are the same, and the natural internal diameter of spring 73 is somewhat smaller than the diameters of the shafts 70 and 72. A pulse-responsive interposer or latch 75 is coupled to the ratchet 74 and is held in position adjacent the said ratchet 74 by a spring 76 whereby, in the absence of pulse input at terminals 77, the interposer 75 restrains rotation of the ratchet 74. In this condition of operation, therefore, the outer wrap spring 73 is caused to exhibit a somewhat larger internal diameter than the diameters of shafts 70 and 72; and no power is transferred through the spring 73 to the output shaft 72 from the constantly rotating power shaft 70.

If now a pulse input should appear at terminals 77, the interposer 75 will be pulled downward thereby releasing the ratchet 74. The wrap spring 73 will thereupon engage the outer peripheries of power shaft 70 and output shaft 72, and will drive the output shaft forward with a torque equal to $$Pr^2w(e^{\mu\phi}-1)$$

where P is the interference pressure, r is the radius of the shafts 70 and 72, w is the width of each wrap spring turn, e is the base of the natural system of logarithms, $\mu$ is the coefficient of friction, and $\phi$ is the number of turns of the wrap spring on the power shaft 70 in radians. The pulsed interposer 75 will thereafter ride upon the external peripheral surface of the ratchet 74, as at 78 (see FIGURE 1B), until the said interposer 75 once more hits a step, such as 79, in the ratchet 74, whereupon the drive spring 73 will once more be disengaged and the output shaft will cease in its rotation.

Referring to FIGURE 1B for the moment, it will be seen that the steps 79 and 80 defined by the ratchet 74, are substantially 180° with respect to one another, and therefore, when the wrap spring clutch, illustrated in FIGURE 1A, is pulsed, the output shaft 72 will define a 180° turn before it is once more caused to stop. During this rotation, a pulley 81 eccentrically coupled to the output shaft 72 by an arm 82, will be caused to move through 180° and through a distance corresponding to twice the eccentricity afforded by arm 82. When the pulley 81 does so move, a cable associated with that pulley will have its effective length changed in the manner described, for instance in the said patent to Henschel et al., whereby a workpiece or transducer coupled to that cable will move through an appropriate distance.

In the particular form of wrap spring clutch shown in FIGURE 1A, a smaller or inner wrap spring 83 is disposed internal of the power shaft 70 and output shaft 72, with the turns of the said spring 83 again being divided between the said shafts 70 and 72. The direction of winding of spring 83 is opposite to that of drive spring 73; and in practice, the spring 83 will slip so long as the power shaft 70 is turning faster than the output shaft 72. If, however, the output shaft 72 should attempt to turn faster than the power shaft 70, the inner spring 83 engages, thereby preventing the output from going faster than the chosen r.p.m. of the power shaft 70.

The stopping torque for the wrap spring clutch, illustrated and described in reference to FIGURE 1A, is provided by a detent system comprising a detent ring 84 carried by the output shaft 82 and cooperating with a pair of detent arms 85. This configuration will be more readily apparent from an examination of FIGURE 1B; and it will be seen that the detent ring 84 preferably includes one or more detent notches 86 and 87, machined into the said ring 84. The detent notches 86 and 87 cooperate with a pair of roller followers 88 and 89 carried respectively by the pair of detent arms 85; and the said detent arms 85 are pivotally mounted at points 90 and are spring-loaded by a spring 91, whereby the roller followers 88 and 89 are urged toward one another into the detent notches 86 and 87. When the drive clutch spring 73 (FIGURE 1A) is engaged by pulsing of the actuator interposer 75, sufficient torque is developed to both accelerate the clutch and to drive it out of its detent position. The output shaft 72 then proceeds to rotate at some specified r.p.m. defined by motor 71, through substantially 180°, in the manner already described; and as this rotation approaches its 180° position, the detent rollers 88 and 89 start to descend the detent notch walls defined by notches 86 and 87. The inner wrap spring 83 does not allow any over-speed of the output shaft 72, and the phasing of the ratchet notches 79 and 80 with respect to the detent notches 86 and 87 is such that the interposer 75 contacts its appropriate step in the ratchet 74 at a time slightly before the detent rollers 88 and 89 reach the bottom of their corresponding detent notches.

If the energy product of the depth of the detent notch and the spring load afforded by spring 91 is greater than the energy contained in the rotation of the clutch, the clutch cannot go past its detent position, and is thus trapped. It is of interest to note that since the free end of the drive spring (that is the end of the spring attached to ratchet 74) is prevented from rotating from a point prior to the zero position of the detent notch, the spring 73 is unwrapped from the shafts 70 and 72 in a static position, and this consideration serves to minimize the wear on the wrap spring 73.

When it is desired to operate a clutch for a shorter cycle time than that already described, and when the stroke of the clutch need not be large, it is possible to operate the clutch through less than 180° in response to a pulse input. The ratchet 74, described in reference to FIGURE 1A, may accordingly be replaced by a ratchet such as 92, shown in FIGURE 1C. This particular ratchet includes four steps (rather than the two steps of ratchet 74), said four steps being equiangularly spaced from one another and cooperating with a pulse responsive interposer, generically illustrated at 93. By reason of this configuration, therefore, the application of a control pulse to the pulse responsive interposer 93 permits the clutch to operate through only 90 degrees (rather than through 180 degrees) whereafter clutch rotation is halted, until occurrence of a further control pulse, by the unwrapping of spring 73 as well as by a detent system similar to that already described in reference to FIGURES 1A and 1B. It should be noted, of course, that when the four-step ratchet 92 is employed, the detent ring (similar to 84) should also have four, rather than two, spaced detent notches (similar to 86 and 87).

While the form of wrap spring clutch described in reference to FIGURE 1A has one end of the spring 73 connected to the output shaft 72, it should be noted that this is not necessary; and if desired, the said one end of spring 73 may be coupled to a mass 94 (see FIGURE 1D), rather than to the shaft 72 itself. This alternative configuration achieves certain appreciable benefits. Thus, the important adjustment in respect to the relationship between the down slope of the detent notch and the detent roller at the moment when the set or step in the ratchet strikes the interposer, such as 75, is now done automatically and continuously.

If the interposer should strike its appropriate ratchet step before the detent roller has reached the detent notch, the spring 73 will stand still as the output comes to a stop. Each time the clutch is pulsed, the leading condition of the wrap spring is decreased until the roller falls into the detent shortly after the release of the drive spring. It should further be noted that, if for some reason such as wear, slippage, or initial adjustment, the opposite condition exists, i.e. the bottom of the detent notch leads the step of the ratchet, the action of mass 94 rectifies this error over a series of cycles; and each time the clutch stops, the mass 94 causes the spring 73 to unwind and shift forward a small amount. Over a series of operational cycles, therefore, the detent roller walks its way down the up-slope of the detents and the two actions then stabilize one another.

Wrap spring clutch actuators, generally of the type described in reference to FIGURES 1A, 1B, 1C and 1D find particular utility in pulley and cable type selector mechanisms, and a preferred form of selector mechanism utilizing such clutches is illustrated in FIGURE 2 of our aforesaid U.S. Patent No. 3,021,512.

It should further be noted that due to the provision of the detent ring and detent arm and followers, described in reference to FIGURE 1B, the over-all clutch operates to position itself with substantially shockless deceleration, whereby noise, shock and wear in the system are substantially reduced.

While preferred embodiments of the present invention have been described, it will be appreciated that many variations will be suggested to those skilled in the art, in accordance with the principles discussed. The foregoing description is therefore meant to be illustrative only and is not limitative of our invention; and all such variations as are in accord with the principles described, are meant to fall within the scope of the appended claims.

Having thus described our invention, we claim:

1. A wrap spring clutch comprising a hollow cylindrical input shaft, a hollow cylindrical output shaft substantially coaxial with said input shaft and spaced axially therefrom, a ratchet rotatably mounted relative to one of said shafts, a first spring disposed adjacent the exterior surfaces of both said input and output shafts and connected at one of its ends to said ratchet, a second spring disposed to engage the interior surface of both said input and output shafts when said output shaft overruns said input shaft, said second spring being attached at one of its ends to one of said shafts, drive means coupled to said input shaft for rotating said input shaft and signal responsive means coupled to said ratchet for selectively causing said first spring to engage the exterior surfaces of said input and output shafts thereby to transfer the rotation of said input shaft to said output shaft.

2. A wrap spring clutch comprising an input shaft, an output shaft substantially coaxial with said input shaft, a wrap spring for engaging said input and output shafts to couple said output shaft to said input shaft to be driven thereby, signal responsive detent means for engaging the end of said wrap spring adjacent said input shaft to disengage said spring from said input shaft, detent means for engaging said output shaft to position said output shaft with respect to a certain reference, the output end of said wrap spring being free to move around said output shaft, and a mass connected to the output end of said wrap spring whereby said spring and output shaft detent means are self adjustable.

References Cited in the file of this patent

UNITED STATES PATENTS

| | | | |
|---|---|---|---|
| 1,629,420 | Starkey | May 17, | 1927 |
| 2,089,807 | Mottlau | Aug. 10, | 1937 |
| 2,161,941 | Zapp | June 13, | 1939 |
| 2,475,432 | Marihart | July 5, | 1949 |
| 2,794,524 | Sacchini et al. | June 4, | 1957 |
| 2,829,748 | Sacchini et al. | Apr. 8, | 1958 |
| 2,895,578 | Winchell | July 21, | 1959 |